July 24, 1962 A. C. GRUSCHOW ETAL 3,045,384
DISPOSABLE MOUSE TRAP
Filed Nov. 5, 1958 2 Sheets-Sheet 1
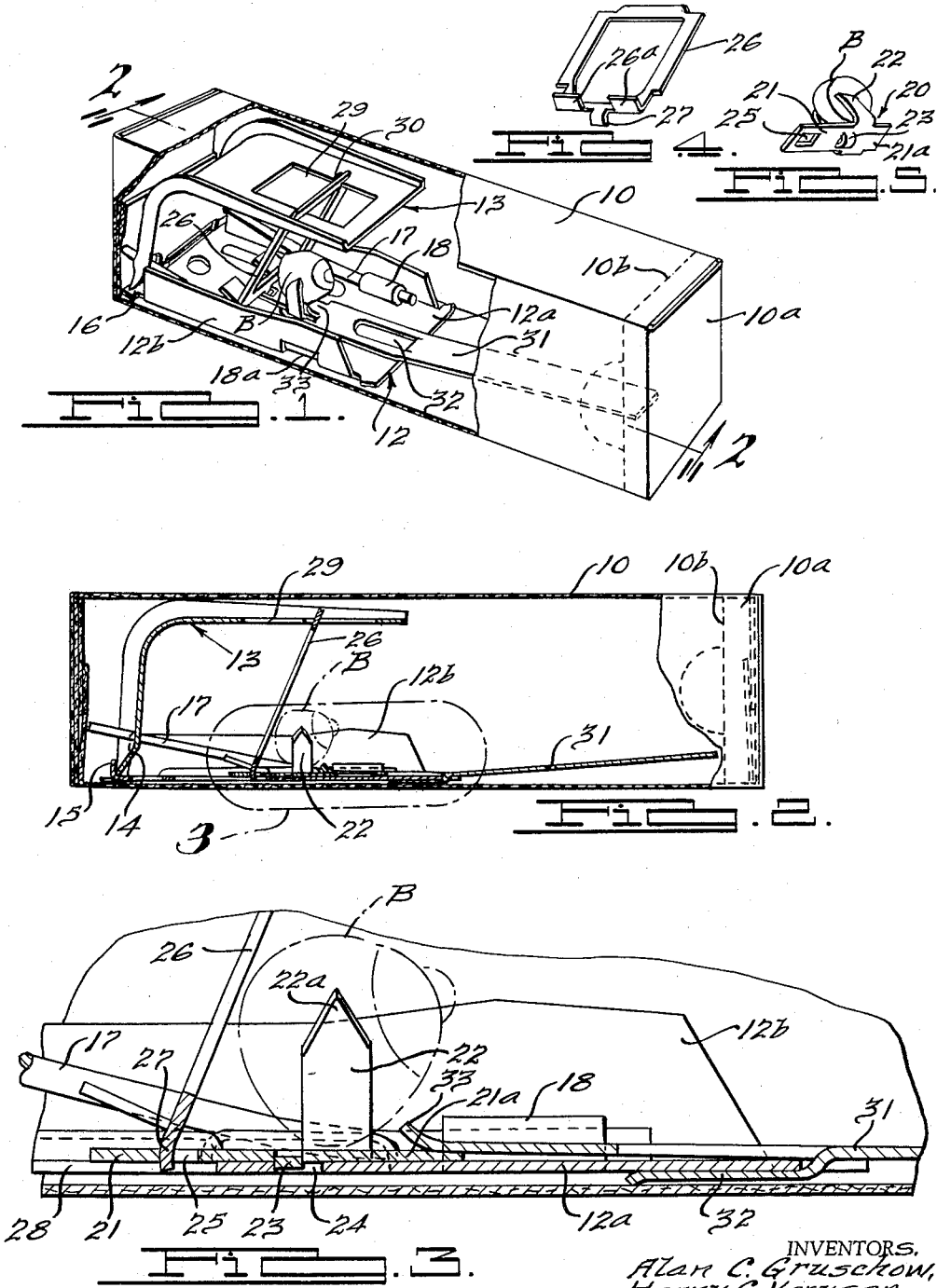
INVENTORS.
Alan C. Gruschow,
Harry C. Veryser,
BY
Elmer Jamison Gray
ATTORNEY.

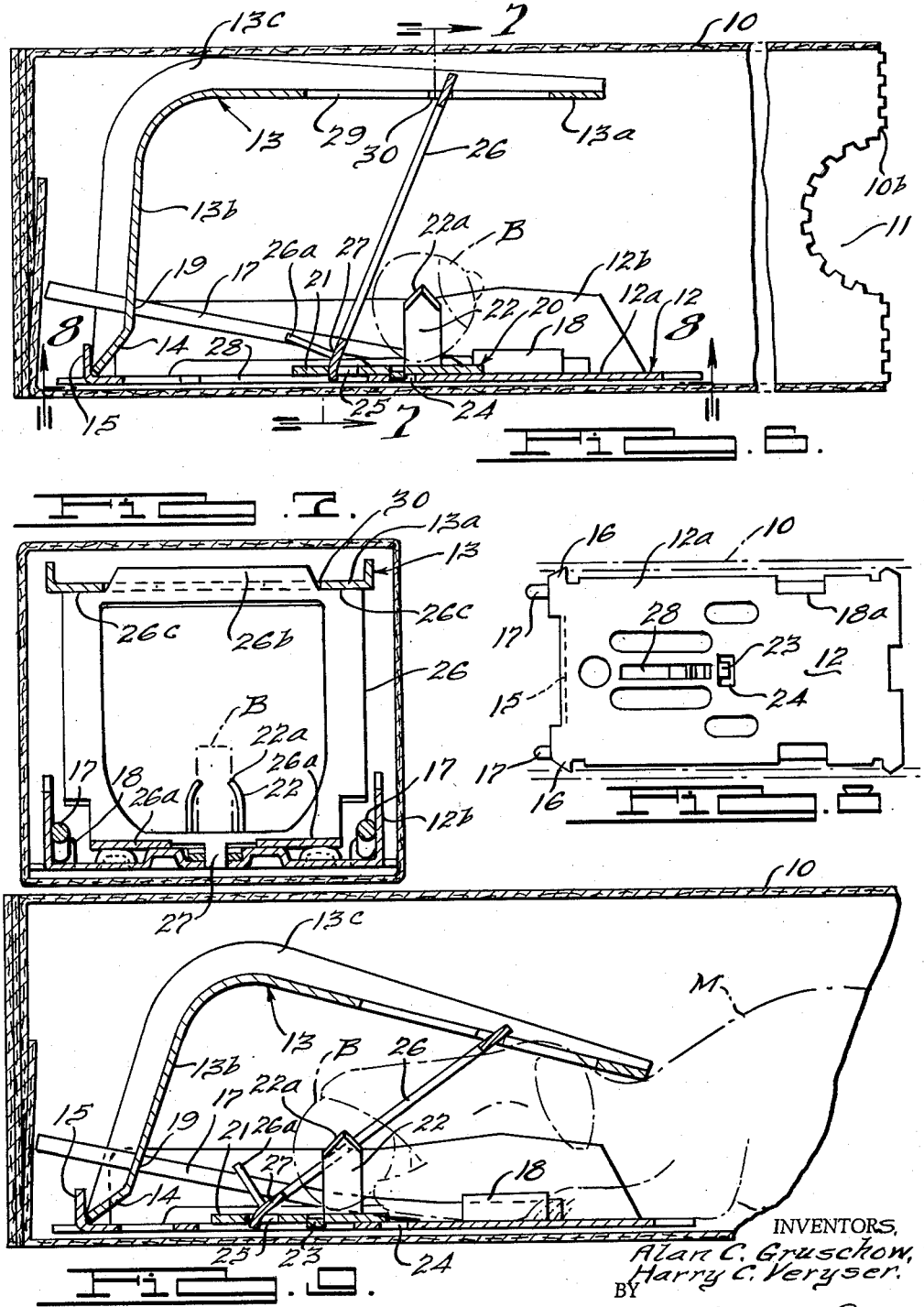

United States Patent Office 3,045,384
Patented July 24, 1962

3,045,384
DISPOSABLE MOUSE TRAP
Allan C. Gruschow, 21680 Strafford Court, Oak Park, Mich., and Harry C. Veryser, 27759 Greenwich, Mount Clemens, Mich.
Filed Nov. 5, 1958, Ser. No. 772,129
11 Claims. (Cl. 43—81.5)

This invention relates to mouse or rodent traps and particularly to a simple disposable trap which may be fabricated at such low cost as to enable it and the rodent trapped therein to be disposed of after a single use.

An important object of the invention is to provide a disposable trap which may be baited so as to entice substantially all types or breeds of mice while also being effective under widely varying climatic conditions.

Another object of the invention is to provide a single usage and inexpensive mouse or rodent trap comprising a box or container adapted to be opened at one end to permit ingress of the mouse or rodent, there being mounted within the box a pair of jaws or trapping members one preferably swingable relative to the other. The jaws are held apart by releasable holding means comprising in part a retainer member spanning the jaws and a releasable bait holder connected to the retainer member for causing the latter normally to hold the jaws separated for reception therebetween of the head of the rodent. The bait holder is released by the rodent gnawing or acting on the bait thereby releasing the retainer member which in turn releases the movable jaw member and causes the same under spring action to spring or snap toward the other jaw against the neck of the rodent in trapping relation thereto.

In accordance with the illustrated embodiment of the invention there is provided an elongated container or enclosure preferably formed of inexpensive paper or cardboard material having at one end a cap or closure which may be readily removed to provide an entrance opening when the trap is disposed for use. Within the opposite end of the box or container there is mounted a generally U-shaped trapping member having upper and lower jaws extending in the direction of the entrance opening. These jaws or trapping members are normally held apart against spring tension or force applied to the upper jaw by means of interconnected retainer and bait holding members, the latter comprising a base strip and spaced clip members extending upwardly therefrom and between which the bait is inserted and held in position. In the present embodiment the bait holder is releasably connected to the lower jaw by a lug or pin and slot connection which is released or disconnected when the bait holder is slightly raised by action of the rodent on the bait. This results in enabling spring means acting on the upper jaw to force the latter toward the lower jaw to produce rodent trapping action while at the same time displacing the retainer member out of holding relation to the upper jaw.

In order to prevent inadvertent release of the bait holder, such as by jarring action during packaging, shipping and handling prior to use, there is provided a detachable locking member for holding the bait holder in fixed position. Upon removing the cap or closure of the container preparatory to use of the trap this locking member is withdrawn through the open end of the container.

Other objects of this invention will appear in the following description and appended claims, reference being had to the accompanying drawings forming a part of this specification wherein like reference characters designate corresponding parts in the several views.

FIG. 1 is a perspective view, partly broken away, of a mouse trap embodying the present invention, said trap being shown in a closed container in shipping condition.

FIG. 2 is a vertical section taken substantially through lines 2—2 of FIG. 1 looking in the direction of the arrows.

FIG. 3 is an enlarged fragmentary sectional view illustrating the structure enclosed within circle 3 of FIG. 2.

FIG. 4 is a perspective view of the jaw retainer member.

FIG. 5 is a perspective view of the bait holding member.

FIG. 6 is an enlarged longitudinal sectional view, partly broken away, illustrating the trap ready for use.

FIG. 7 is a vertical section taken substantially through lines 7—7 of FIG. 6 looking in the direction of the arrows.

FIG. 8 is a view of the bottom of the trap taken through lines 8—8 of FIG. 6.

FIG. 9 is a view in part similar to FIG. 6 illustrating the mouse or rodent trapped within the enclosure.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As illustrated in the drawings the rodent trap enclosure comprises a generally rectangular box or container 10 fabricated from suitable inexpensive stiff paper-like material such as cardboard. When fabricated for sales purposes the container, as illustrated in FIG. 1, has fully enclosing walls including a removable front end cap 10a held in place by serrations 10b enabling ready removal of the cap or end piece when the trap is to be used, as illustrated in FIG. 6, thereby providing a front opening 11 to permit entry of a rodent or mouse into the container.

Disposed within the closed rear end of the container is generally U-shaped trapping means comprising a lower fixed jaw member 12 and an upper swingable jaw member 13. The lower jaw member 12 is channel-shaped and comprises a bottom web 12a and upwardly extending side flanges 12b. The upper jaw member 13 is angularly shaped to provide an upper web 13a extending normally horizontally and a downwardly extending rear web or flange 13b, these webs being provided with a continuous edge flange 13c. The rear web 13b at its lower edge is centrally slotted or notched to provide spaced lugs 14 pivotally engaging a flange 15 bent up from a rear edge portion of the bottom web 12a of the lower jaw member beyond the terminal ends of the side flanges 12b thereof. The bottom web of the lower jaw member 12 is formed with outwardly flaring lugs 16, see FIGS. 1 and 8, which sufficiently embed in the side walls of the container 10 so as to anchor the trapping member in position within the rear end of the container. By virtue of this construction it is not possible for the mouse or rodent to pull the trapping means out of the container during any possible time while surviving the action of the trapping jaw members.

For the purpose of forcing the upper jaw member 13 from the position shown in FIG. 6 to the rodent trapping position shown in FIG. 9, there are provided two spring bars 17. The forward ends of these spring bars are anchored in position by means of lugs 18 which are punched out of the flanges 12b indicated at 18a, as particularly illustrated in FIGS. 1 and 8. From their front anchored positions the spring bars 17 extend rearwardly and freely at 19 through apertures in the rear web or flange 13b of the upper jaw member. By virtue of this construction the upper jaw member 13 is normally strongly biased toward the lower jaw member 12, this being due to the continuous downward pressure exerted by the spring bars 17 at localities 19 in advance of the pivotal connection 14, 15 between the upper and lower jaw members.

For the purpose of releasably holding the jaws apart, as illustrated in FIG. 6, there is provided a releasable bait holder 20 connected to a retainer member spanning the box. This bait holder, as particularly illustrated in FIG. 5, comprises a base strip 21 from which project upwardly a pair of clip members 22. These clip members terminate at the upper ends thereof in inwardly tapering bait grippers 22a. Any suitable bait for the rodent may be clamped in position between the grippers 22a such, for example, as a specially treated kernel of corn B.

As illustrated particularly in FIG. 5, the base strip 21 of the bait holder 20 is formed with a downward locking lug or projection 23 which is pressed from the strip 21 at a locality slightly rearwardly of the bait clip members 22. When the bait holder 20 is in its normal position, as illustrated in FIG. 6, the lug or projection 23 extends within a slot or hole 24 in the bottom 12a of the lower jaw member, this being particularly illustrated in FIGS. 3 and 8. Rearwardly of the locking lug 23 the base strip 21 of the bait holder is provided with an aperture or hole 25. There is provided a four sided retainer member 26 adapted to cooperate with the bait holder 20 for normally holding the jaws 12 and 13 apart. This retainer member, as illustrated particularly in FIG. 4, is formed with spaced reinforcing flanges 26a at the lower edge thereof. Between these flanges the retainer member is formed with a central downwardly extending lug 27 which projects through aperture 25 in the bait holder and thence freely into a longitudinal slot 28 in the bottom web 12a of the lower jaw member 12, this slot being formed rearwardly of the hole 24 in the bottom web, as particularly shown in FIG. 3. From the foregoing it will be seen that the lug 27 disposed at all times within the aperture 25 provides an interlocking connection between the bait holder 20 and retainer member 26.

The web 13a of the upper jaw member is formed with an opening 29, see particularly FIG. 1. The side edges of this opening are formed with opposed notches 30 freely receiving in interlocking relation a flange portion 26b projecting from the upper side of the retainer member 26, see particularly FIG. 7. The edge portions 26c at opposite sides of the flange 26b abut the underside of web 13a of the upper jaw member 13. This interlocking connection between retainer member 26 and upper jaw member 13 enables the latter to force the lower portion of the retainer member rearwardly when the locking lug 23 is raised out of the notch 24, this action being clearly indicated by comparing FIGS. 3 and 9. Thus, when the mouse M enters the container and grasps the bait B it will raise the bait sufficiently to disengage the locking lug 23 from the aperture 24 in the bottom web 12a of the lower jaw member. When this occurs the spring 17 will swing the upper jaw member 13 downwardly from the position shown in FIG. 6 to the position shown in FIG. 9.

For the purpose of assuring retention of the bait B and bait holder 20 in proper position, as shown in FIGS. 1 to 3, under conditions arising from packaging, handling, and shipping prior to use there is provided a removable locking member 31 formed from a sheet metal strip. Stamped from this strip is a clamping member 32 forming with the main body of the strip a channel within which the bottom web 12a of the lower jaw member has tight engagement when the locking member is forced into operative position. When thus positioned the inner end 33 of the locking member overlies and firmly engages a projecting portion 21a of the base strip of the bait holder, thereby holding the same in fixed position and preventing the locking lug 23 from being disengaged from the aperture 24 in the bottom web of the lower jaw member.

We claim:

1. A rodent trap comprising an enclosure having an opening at its forward end adapted to admit entry therein of a rodent and having a closed rear end, a pair of upper and lower trapping jaw members in said enclosure and secured thereto adjacent said closed end, said jaw members at all times extending forwardly in the direction of said opening in overlying relation, spring means, means for pivotally connecting the upper jaw member to the rear end of the lower jaw member thereby enabling the upper jaw member to swing under action of said spring means in a downward direction toward the lower jaw member, a bait holder provided with connecting means releasably connected to the lower jaw member, said bait holder together with said connecting means upon release of the latter being conjointly fully and bodily displaced relative to said lower jaw member, a retainer member connected to the bait holder and also connected to the upper jaw member in all positions thereof and effective to hold the same in spaced relation to the lower jaw member in rodent receiving relation, said bait holder upon predetermined action of the rodent being releasable thereby releasing the retainer member for bodily displacement therewith and permitting the upper jaw member to swing downwardly into rodent trapping relation to the lower jaw member.

2. A rodent trap comprising an enclosure having an opening at the forward end thereof adapted to admit entry therein of a rodent and having a closed opposite end, a pair of trapping jaw members within said enclosure and secured thereto adjacent said closed end, said jaw members at all times extending forwardly in the direction of said opening, spring means for causing said jaw members to be relatively movable under spring action into rodent trapping relation, and means effective to releasably hold said members spaced apart in rodent receiving overlying relation, said means comprising a bait holder having a releasable connection with one jaw member and releasable therefrom for full bodily displacement relative thereto and a retainer member having one end connected to the bait holder for movement therewith and having its opposite end connected to the other jaw member thereby to span the jaw members in all positions of the retainer member, said bait holder upon predetermined action of the rodent on the bait being releasable from said one jaw member and effective upon said bodily displacement thereof to release the retainer member and permit relative movement of the jaw members into trapping relation.

3. A rodent trap comprising an enclosure having an opening at the forward end thereof adapted to admit entry therein of a rodent and having a closed opposite end, a pair of trapping jaw members secured to said enclosure adjacent said closed end, said jaw members at all times extending forwardly in the direction of said opening, means for pivotally mounting one jaw member for pivotal movement in a downward direction toward the other jaw member under spring action into rodent trapping relation, a bait holder having a releasable connection with said other jaw member and releasable therefrom for full bodily displacement relative thereto, a retainer member connected to said bait holder and said one jaw member in all positions thereof and spanning the space between the jaw members to hold them spaced apart in rodent receiving relation, said bait holder upon predetermined action of the rodent being releasable and effective upon said bodily displacement thereof to release said retainer member and permit relative movement of the jaw members into trapping relation.

4. A rodent trap comprising an enclosure having an opening at the forward end thereof adapted to admit entry therein of a rodent and having a closed opposite end, a pair of trapping jaw members secured to said enclosure adjacent said closed end, said jaw members at all times extending forwardly in the direction of said opening, one jaw member being mounted for pivotal movement toward the other jaw member into rodent trapping relation, spring means acting on said one jaw member for urging the same toward the other jaw member, a bait holder releasably connected to said other jaw member for full bodily displacement relative thereto, a retainer member connected to said bait holder and said one jaw member in all positions thereof and spanning the space between the jaw members to hold them spaced apart in rodent receiving relation, said bait holder upon predetermined action of the rodent being shiftable upwardly to release the same thereby releasing said retainer member for bodily displacement therewith and permitting said spring means to impart relative movement of the jaw members into trapping relation.

5. A rodent trap comprising an enclosure having an opening at its forward end adapted to admit entry therein of a rodent and having a closed opposite end, a pair of upper and lower trapping jaw members in said enclosure and secured thereto adjacent said closed end, said jaw members at all times extending forwardly in the direction of said opening, spring means, the upper jaw member being pivotally mounted for movement toward and in overlying relation to the lower jaw member under action of said spring means into rodent trapping relation, a bait holder provided with connecting means releasably connected to the lower jaw member, said bait holder together with said connecting means upon release of the latter being conjointly fully and bodily displaced relative to said lower jaw member, a retainer member connected to the bait holder and also connected to the upper jaw member in all positions thereof and effective to hold the same in spaced relation to the lower jaw member in rodent receiving relation, said bait holder upon predetermined action of the rodent being releasable thereby releasing the retainer member for bodily displacement therewith and permitting the upper jaw member to swing downwardly into rodent trapping relation to the lower jaw member.

6. A rodent trap according to claim 2 wherein the releasable connection between the bait holder and lower jaw member comprises a projection on one extending into an opening in the other, said connection being releasable upon action of the rodent to raise the bait and bait holder.

7. A rodent trap according to claim 5 wherein the releasable connection between the bait holder and lower jaw member comprises a projection on one extending into an opening in the other, said connection being releasable upon action of the rodent to raise the bait and bait holder.

8. A rodent trap comprising an enclosure having an opening at its forward end adapted to admit entry therein of a rodent and having a closed rear end, a pair of upper and lower trapping jaw members in said enclosure extending at all times forwardly in the direction of said opening, the upper jaw member being pivotally mounted in said enclosure adjacent said closed rear end for movement toward the lower jaw member into rodent trapping relation, spring means acting on the upper jaw member at a locality in advance of its pivotal mounting for urging the same toward the lower jaw member, a bait holder releasably connected to the lower jaw member for full bodily displacement relative thereto, a retainer member connected at its lower end to the bait holder and also connected at its upper end to the upper jaw member to hold the same in spaced relation to the lower jaw member in rodent receiving relation, said bait holder upon predetermined action of the rodent being bodily displaceable in an upward direction thereby releasing the lower end of the retainer member for bodily displacement rearwardly by the upper jaw member upon swinging of the latter downwardly under spring action into rodent trapping relation to the lower jaw member.

9. A rodent trap comprising an enclosure having an opening at its forward end adapted to admit entry therein of a rodent and having a closed rear end, a pair of trapping jaw members within said enclosure extending at all times in the direction of said opening, spring means for causing said jaw members to be relatively movable under spring action into rodent trapping relation, and means effective to releasably hold said members spaced apart in rodent receiving relation, said means comprising an upwardly displaceable and thereby releasable bait holder and a retainer member connected to the bait holder and spanning the jaws, said bait holder and retainer member being releasable upon predetermined action of the rodent on the bait thereby permitting relative movement of the jaw members into trapping relation, and means removable through the enclosure opening for detachably holding the bait holder against upward displacement to effect release thereof.

10. A rodent trap according to claim 2 including means removable through the enclosure opening for detachably holding the bait holder against release.

11. A rodent trap according to claim 5 including means removable through the enclosure opening and having a portion overlying a portion of the bait holder for detachably holding the same against release.

References Cited in the file of this patent

UNITED STATES PATENTS

| | | |
|---|---|---|
| 1,327,890 | Twitchell | Jan. 13, 1920 |
| 1,455,106 | Butler | May 15, 1923 |
| 1,511,123 | Hart | Oct. 7, 1924 |
| 1,762,783 | Kascak | June 10, 1930 |
| 1,826,799 | Lehuta | Oct. 13, 1931 |
| 2,222,653 | Chambless et al. | Nov. 26, 1940 |
| 2,332,334 | Morrison | Oct. 19, 1943 |